US009517373B2

(12) United States Patent
Rendon

(10) Patent No.: US 9,517,373 B2
(45) Date of Patent: Dec. 13, 2016

(54) SPRINKLER HEAD REMOVAL SYSTEM AND METHOD

(76) Inventor: Danny Rendon, Amarillo, TX (US)

( * ) Notice: Subject to any disclaimer, the term of this patent is extended or adjusted under 35 U.S.C. 154(b) by 553 days.

(21) Appl. No.: 13/543,132

(22) Filed: Jul. 6, 2012

(65) Prior Publication Data

US 2014/0007399 A1 Jan. 9, 2014

(51) Int. Cl.

| | |
|---|---|
| ***B23P 19/00*** | (2006.01) |
| ***A62C 35/68*** | (2006.01) |
| ***B25B 27/14*** | (2006.01) |
| *B05B 15/06* | (2006.01) |

(52) U.S. Cl.
CPC ............. *A62C 35/68* (2013.01); *B25B 27/143* (2013.01); *B05B 15/062* (2013.01); *Y10T 29/49815* (2015.01); *Y10T 29/53* (2015.01)

(58) Field of Classification Search
CPC ........ B23P 19/00; B25B 27/143; B25B 11/00; B25B 25/00; B05B 15/06; B05B 1/00
USPC ............ 29/426.1, 426.5, 270, 280; 81/176.3, 81/176.15, 442, 436
See application file for complete search history.

(56) References Cited

U.S. PATENT DOCUMENTS

| | | | | |
|---|---|---|---|---|
| 2,659,256 | A * | 11/1953 | Palmer | 81/176.15 |
| 3,348,293 | A * | 10/1967 | Newton | B25B 27/143 29/227 |
| 3,952,618 | A * | 4/1976 | Seamon | 81/441 |
| 3,977,063 | A | 8/1976 | Bruninga | |
| 4,788,894 | A | 12/1988 | Mitschele | |
| 5,184,531 | A | 2/1993 | Wickson | |
| 6,425,564 | B1 | 7/2002 | Harnik | |
| 2002/0139225 | A1* | 10/2002 | Carter | 81/176.3 |

* cited by examiner

*Primary Examiner* — John C Hong
(74) *Attorney, Agent, or Firm* — Shannon L Warren

(57) ABSTRACT

A sprinkler head removal is disclosed. The sprinkler head remover comprises a tip portion having a width, a shaft having a first end and a second end; and, a handle having a first end and a second end. The tip portion releaseably connects to a sprinkler socket of a sprinkler head. The tip portion attaches to the first end of the shaft. The handle attaches to the second end of the shaft. The width of the tip portion varies according to an internal diameter of the sprinkler socket.

10 Claims, 12 Drawing Sheets

SPRINKLER HEAD REMOVAL SYSTEM AND METHOD

BACKGROUND

This disclosure relates generally to a sprinkler head removal system and method. None of the disclosed inventions and patents, taken either singularly or in combination, is seen to describe the instant disclosure as claimed. Accordingly, an improved sprinkler head removal system and method would be advantageous.

SUMMARY

A sprinkler head removal and a method of using a sprinkler head remover are disclosed. In one embodiment, said sprinkler head remover comprises a tip portion having a width, a shaft having a first end and a second end; and, a handle having a first end and a second end. Said tip portion releasably connects to a sprinkler socket of a sprinkler head. Said tip portion attaches to said first end of said shaft. Said handle attaches to said second end of said shaft. Said width of said tip portion varies according to an internal diameter of said sprinkler socket.

In another embodiment, said sprinkler head remover comprises a tip portion and a handle having a first end and a second end. Said tip portion is capable of releasably connecting to a sprinkler socket of a sprinkler head. Said tip portion connects to said handle.

A method of using a sprinkler head remover comprises: releasably connecting to a sprinkler socket of a sprinkler head with a tip portion of a sprinkler head remover, rotating said sprinkler socket from a fluid source pipe, dislodging said sprinkler socket from said fluid source pipe, and removing said sprinkler socket. Said sprinkler head remover comprises a handle. Said tip portion connects to said handle.

BRIEF DESCRIPTION OF THE DRAWINGS

FIG. 2D illustrates a location for the cross-sections of FIGS. 2E and 2F.

FIG. 6A illustrates an expanded configuration of said adjustable tip portion.

FIG. 6B illustrates a contracted configuration of said adjustable tip portion.

FIG. 7A illustrates said adjustable tip portion with a cross-section view of said ground.

FIG. 7B illustrates an elevated cross-section view of said sprinkler socket with a cross-section of said adjustable tip portion inserted therein.

FIG. 9B illustrates an expanded configuration of said adjustable tip portion.

FIG. 9C illustrates a contracted configuration of said adjustable tip portion.

DETAILED DESCRIPTION

Described herein is a sprinkler head removal system and method. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1A:
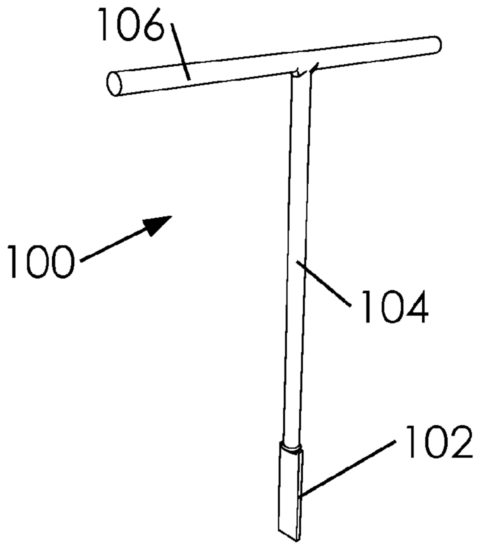
FIGS. 1A, 1B and 1C illustrate a perspective front view, an elevated front view and an elevated side view of a sprinkler head remover.
Figure 1B:
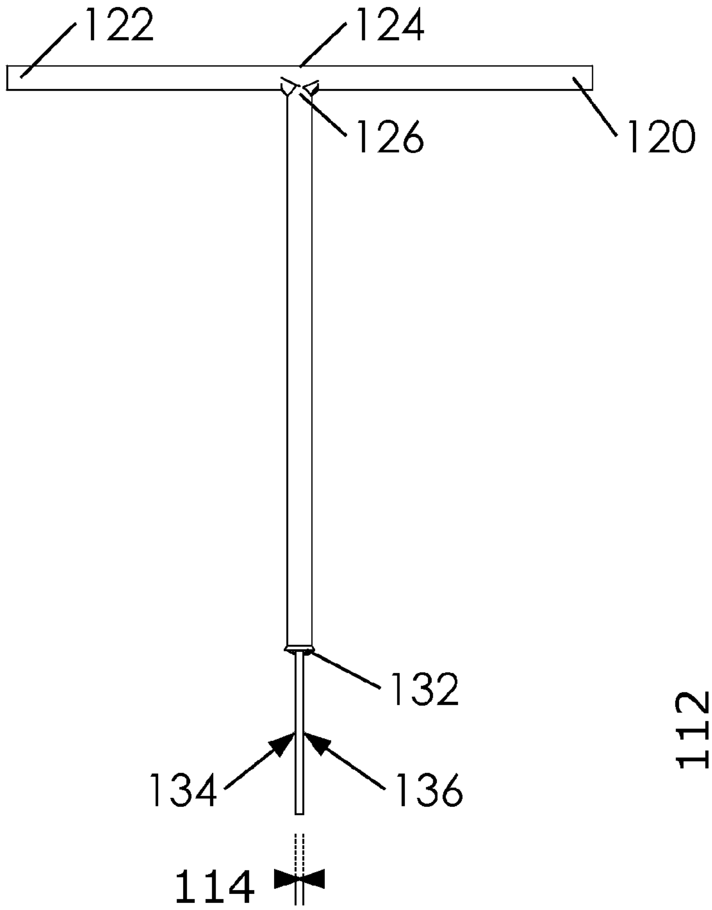
Figure 1C:
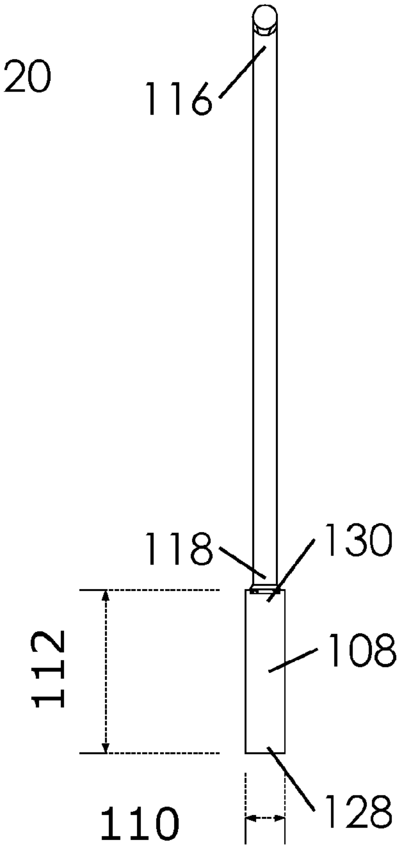

FIGS. 1A, 1B and 1C illustrate a perspective front view, an elevated front view and an elevated side view of a sprinkler head remover 100. Said sprinkler head remover 100 can comprise a tip portion 102, a shaft 104 and a handle 106. In one embodiment, said sprinkler head remover 100 can comprise said tip portion 102 and said handle 106; wherein, said tip portion 102 attaches directly to said handle 106. In another embodiment, said sprinkler head remover 100 can comprise said tip portion 102 attached to a portion of said shaft 104; and said handle 106 attached to another portion of said shaft 104. In one embodiment, said tip portion 102 can comprise a planar portion 108. In one embodiment, said planar portion 108 can comprise a width 110, a height 112 and a depth 114.

In one embodiment, said shaft 104 can comprise a first end 116 and a second end 118. In one embodiment, said tip portion 102 can attach to said second end 118. In one embodiment, said handle 106 can comprise a first end 120, a second end 122 and a center portion 124. In one embodiment, said first end 116 can connect to said center portion 124 at a joint 126.

In one embodiment, said shaft 104 and said handle 106 can each comprise a cylindrical shape. In one embodiment, said first end 116 can connect at said center portion 124 with said joint 126 at a substantially perpendicular angle. In one embodiment, said joint 126 can comprise a weld of said shaft 104 to said handle 106.

In one embodiment, said planar portion 108 can comprise a first end 128 and a second end 130. In one embodiment, said shaft 104 can attach to said tip portion 102 with a weld 132. In one embodiment, said second end 118 of said shaft 104 can attach to said second end 130 said tip portion 102 with said weld 132. In one embodiment, said planar portion 108 can comprise a first side 134 and a second side 136.

Figure 2A:
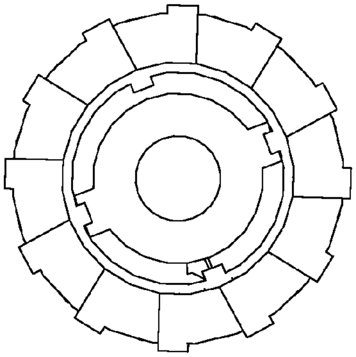
FIGS. 2A, 2B and 2C illustrate an elevated top view, an elevated side view, and a perspective overview of a sprinkler socket.
Figure 2C:
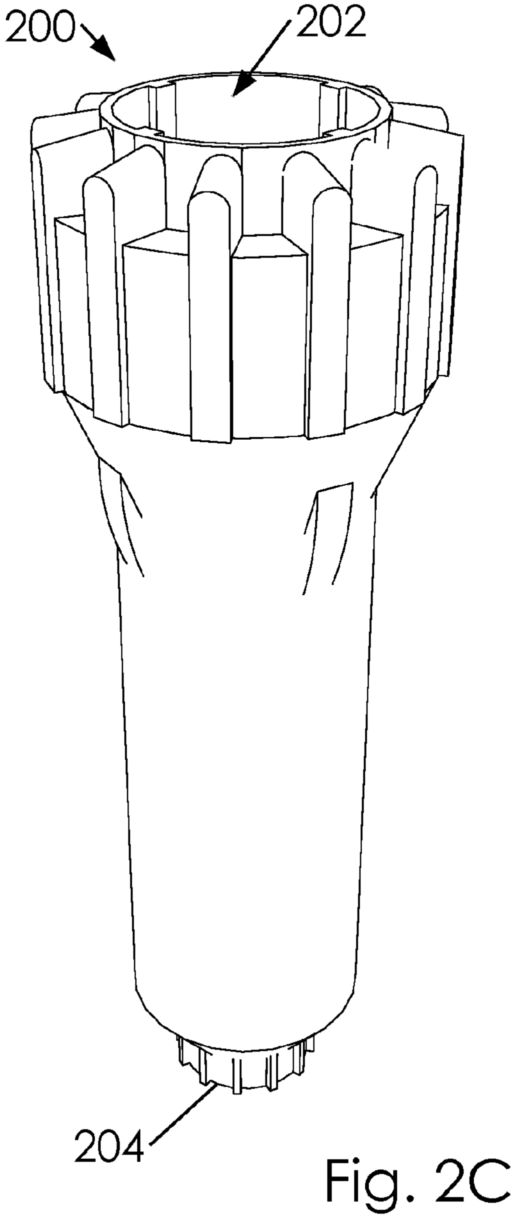
Figure 2B:
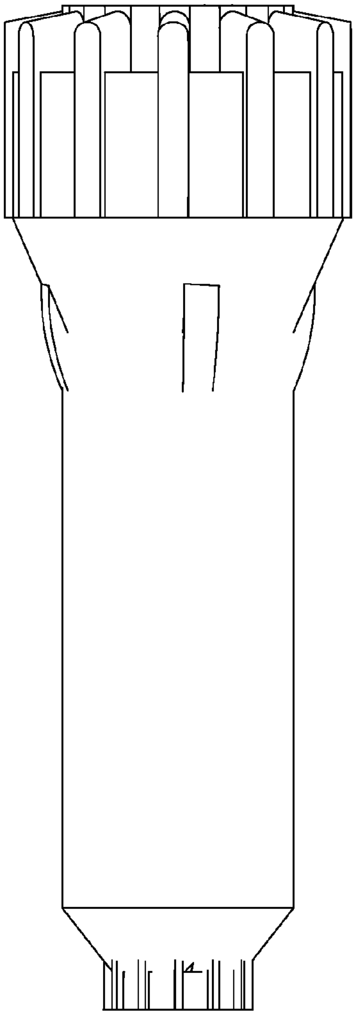

FIGS. 2A, 2B and 2C illustrate an elevated top view, an elevated side view, and a perspective overview of a sprinkler socket 200. In one embodiment, said sprinkler socket 200 can comprise a portion of a sprinkler head. In one embodiment, said sprinkler socket 200 can be capable of holding a sprinkler nozzle. In one embodiment, said sprinkler socket 200 can comprise a substantially cylindrical body with an open top end 202 and a threaded bottom end 204.

Figure 2D:
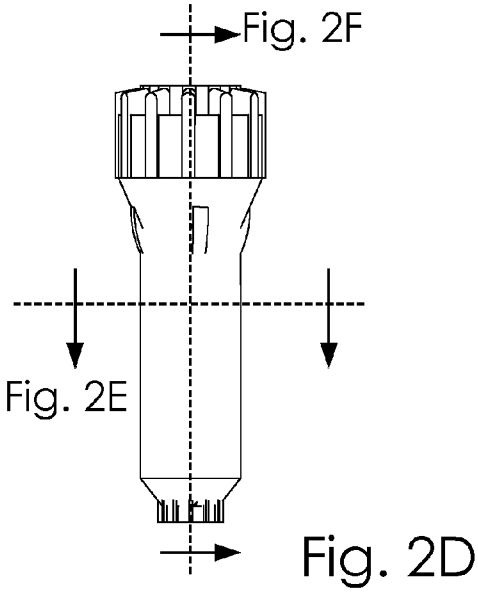
FIGS. 2D, 2E and 2F illustrate an elevated front view, a perspective front cross-section view and a perspective cross-section side view of said sprinkler socket.
Figure 2E:
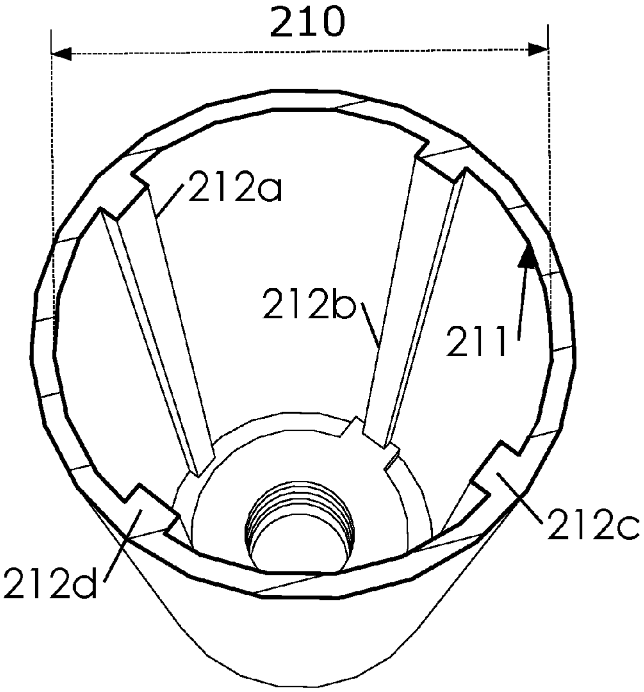
Figure 2F:
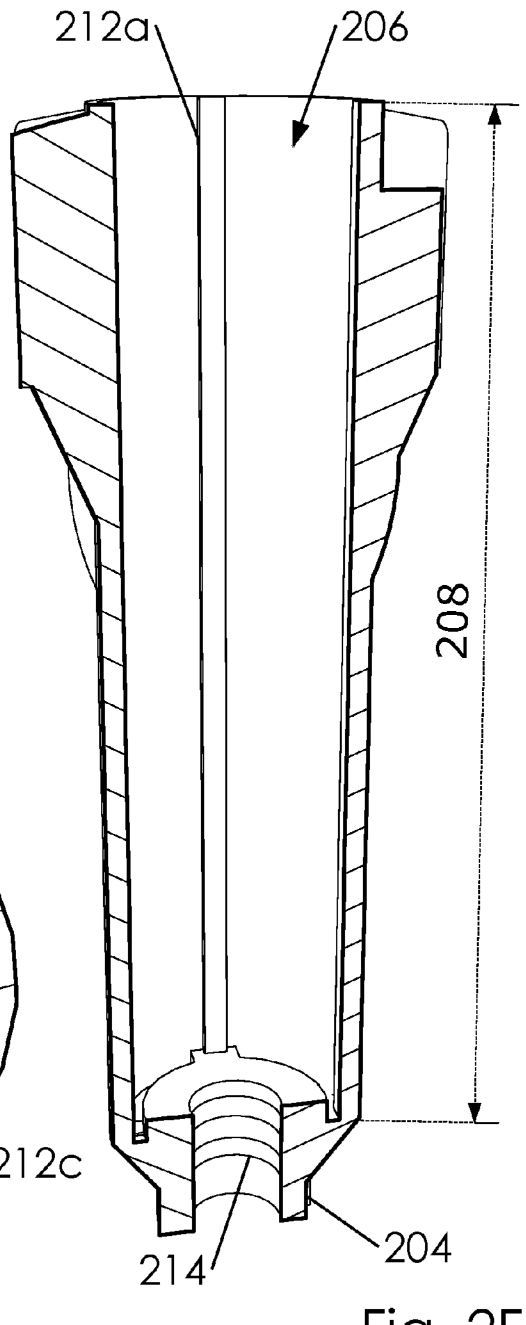

FIGS. 2D, 2E and 2F illustrate an elevated front view, a perspective front cross-section view and a perspective cross-section side view of said sprinkler socket 200. FIG. 2D illustrates a location for the cross-sections of FIGS. 2E and 2F. In one embodiment, said sprinkler socket 200 can comprise an internal chamber 206. In one embodiment, said internal chamber 206 can comprise a height 208 and an internal diameter 210. In one embodiment, one or more ridges can be arranged about an internal perimeter 211 of said internal chamber 206 of said sprinkler socket 200. In one embodiment, said one or more ridges can comprise a first ridge 212*a*, a second ridge 212*b*, a third ridge 212*c* and a fourth ridge 212*d*. In one embodiment, said sprinkler socket 200 can further comprise a female threading 214 at said threaded bottom end 204.

Since said sprinkler socket 200 can be manufactured and sold in a range of sizes, said internal diameter 210 can comprise 1¹⁄₁₆ inches in one embodiment and 2³⁄₁₆ inches in another embodiment.

Figure 2G:
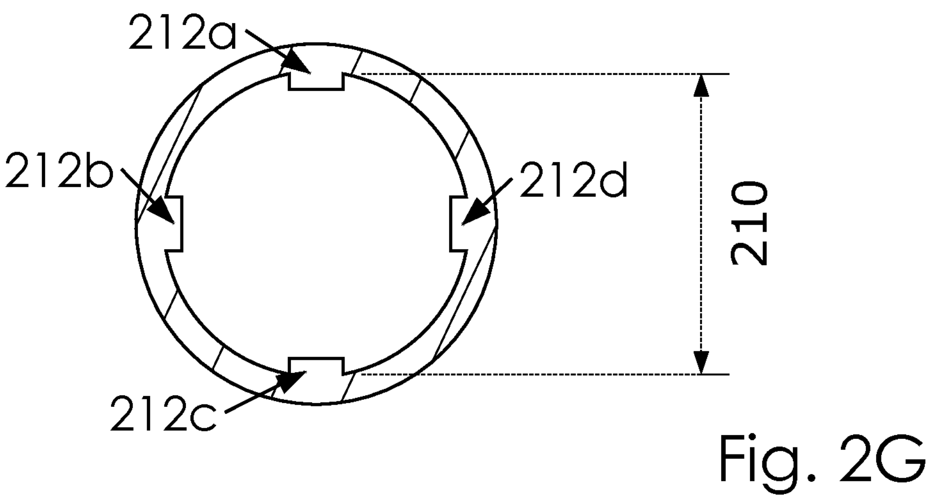
FIGS. 2G, 2H and 2I illustrate three elevated cross-section embodiments of said one or more ridges within said internal chamber.
Figure 2H:
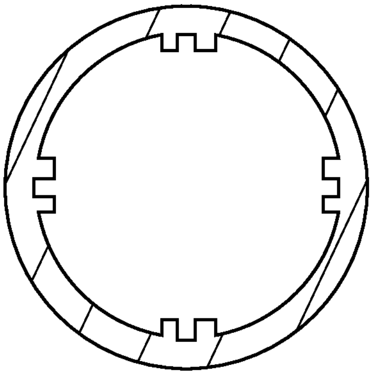
Figure 2I:
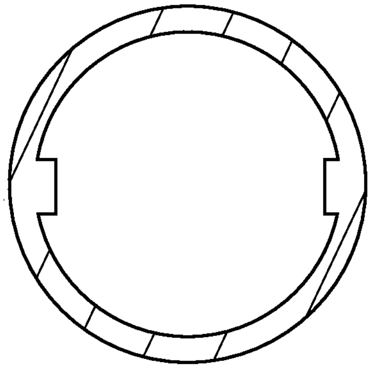

FIGS. 2G, 2H and 2I illustrate three elevated cross-section embodiments of said one or more ridges within said internal chamber 206. In one embodiment, said one or more ridges can comprise four similar notches around said internal perimeter 211, as illustrated in FIG. 2G. In another embodiment, said one or more ridges can comprise four sets of notches arranged around said internal perimeter 211, as illustrated in FIG. 2H. In another embodiment, said one or more ridges can comprise two notches arranged opposite from one another around said internal perimeter 211, as illustrated in FIG. 2I.

In one embodiment, one or more portions of said tip portion 102 of said sprinkler head remover 100 can press against one or more of said one or more ridges. Accordingly, said height 112 of said planar portion 108 of said tip portion 102 can be similar to or greater than said height 208 of said one or more ridges within said internal chamber 206; wherein, increasing said height 112 of said tip portion 102 can increase said one or more portions of said tip portion 102 pressing against said one or more of said one or more ridges. Further discussion of an interaction between said sprinkler socket 200 and said tip portion 102 is presented infra.

Figure 3A:
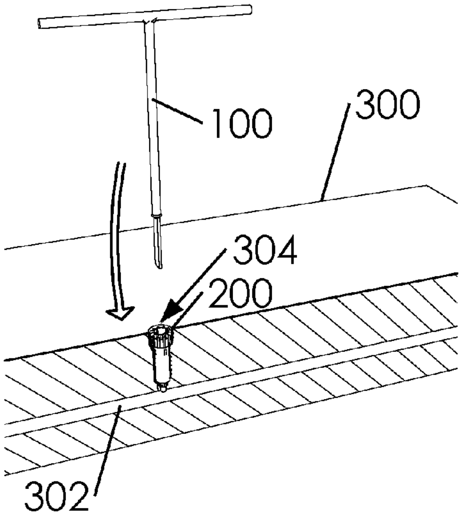
FIGS. 3A, 3B and 3C illustrate three perspective overviews of said sprinkler head remover in use.
Figure 3B:
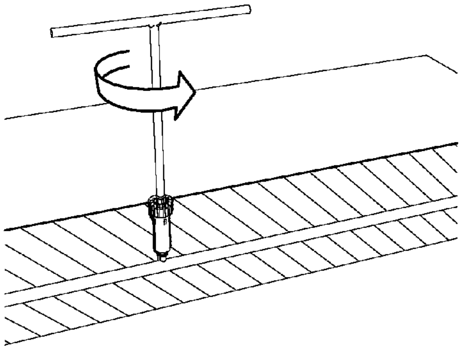
Figure 3C:
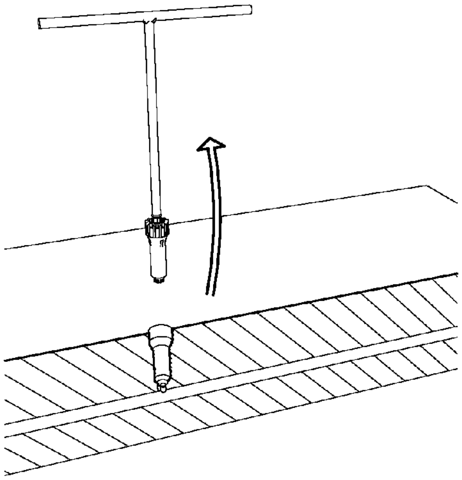

FIGS. 3A, 3B and 3C illustrate three perspective overviews of said sprinkler head remover 100 in use. In one embodiment, said sprinkler socket 200 can attach to an irrigation system in a ground 300. In one embodiment, said irrigation system can comprise a fluid source pipe 302. In one embodiment, said fluid source pipe 302 can carry a fluid to one or more nodes (such as said sprinkler socket 200). In one embodiment, said sprinkler socket 200 can attach to said fluid source pipe 302. In one embodiment, said fluid source pipe 302 can be buried under said ground 300. In one embodiment, said sprinkler socket 200 can reach said fluid source pipe 302 through a hole 304. In one embodiment, said sprinkler socket 200 can attach to said fluid source pipe 302 by screwing said female threading 214 of said sprinkler socket 200 to a male threading of a spout on said fluid source pipe 302, as is well-known in the art.

In one embodiment, removing said sprinkler head from said hole 304 can comprise: removing said sprinkler nozzle from said sprinkler head, and removing said sprinkler socket 200 from said fluid source pipe 302 and hole 304. Formerly, manually removing said sprinkler socket 200 from said fluid source pipe 302, within said hole 304, can be difficult due to a confined space within said hole 304 around said sprinkler socket 200. In one embodiment, said sprinkler head removal system and method can simplify this process.

In one embodiment, removing said sprinkler socket 200 from said fluid source pipe 302 can comprise: inserting said tip portion 102 of said sprinkler head remover 100 into said internal chamber 206 of said sprinkler socket 200; catching one or more of said one or more ridges with one or more portions of said tip portion 102; turning said sprinkler head remover 100 in order to loosen said sprinkler socket 200 from said fluid source pipe 302; dislodging said sprinkler socket 200 from said fluid source pipe 302; and pulling said sprinkler socket 200 from said hole 304.

Figure 3D:
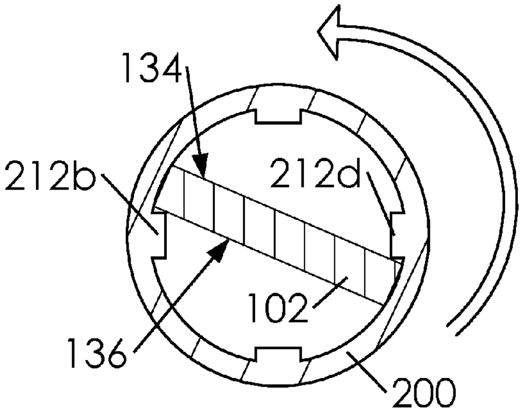
FIG. 3D illustrates an elevated cross-section view of said sprinkler socket with a cross-section of said tip portion inserted therein.

FIG. 3D illustrates an elevated cross-section view of said sprinkler socket 200 with a cross-section of said tip portion 102 inserted therein. In one embodiment, catching one or more of said one or more ridges with one or more portions of said tip portion 102 can comprise: inserting said planar portion 108 into said internal chamber 206; rotating said planar portion 108 about a vertical axis of said sprinkler socket 200; pressing said first side 134 against a first of said one or more ridges (such as said fourth ridge 212*d*); pressing said second side 136 against a second of said one or more ridges (such as said second ridge 212*b*). In one embodiment, said width 110 of said tip portion 102 can be equal to or less than said internal diameter 210 of said internal chamber 206.

Figure 4A:
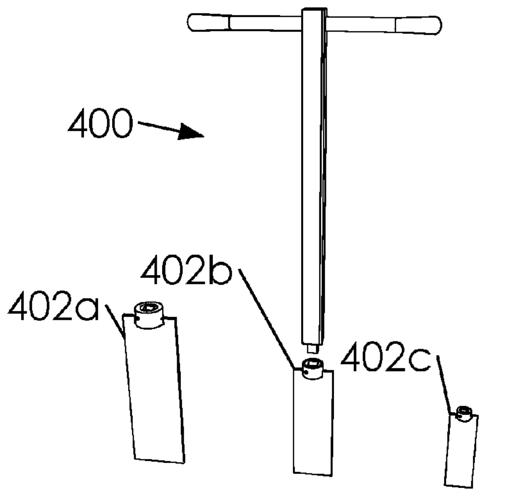
FIG. 4A illustrates a perspective overview of a sprinkler head remover and a one or more removable tip portions.

FIG. 4A illustrates a perspective overview of a sprinkler head remover 400 and a one or more removable tip portions. In one embodiment, said one or more removable tip portions can comprise a first tip portion 402*a*, a second tip portion 402*b* and a third tip portion 402*c*.

Figure 4B:
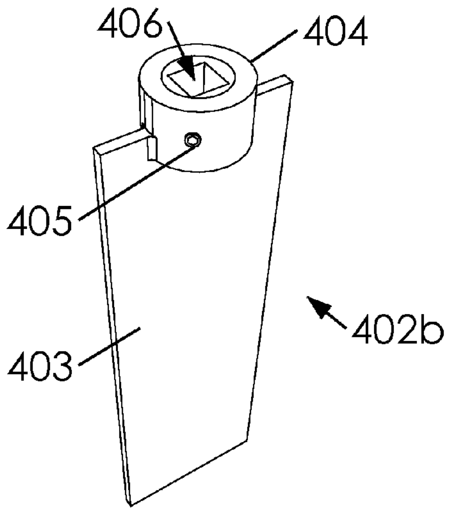
FIG. 4B illustrates a perspective overview of said second tip portion.

FIG. 4B illustrates a perspective overview of said second tip portion 402*b*. In one embodiment, said one or more removable tip portions can each comprise a planar portion 403 and a socket portion 404. In one embodiment, said socket portion 404 can comprise a locking screw 405 and a socket 406. In one embodiment, said planar portion 403 can be substantially planar. In one embodiment, said planar portion 403 can attach to said socket portion 404.

Figure 4C:
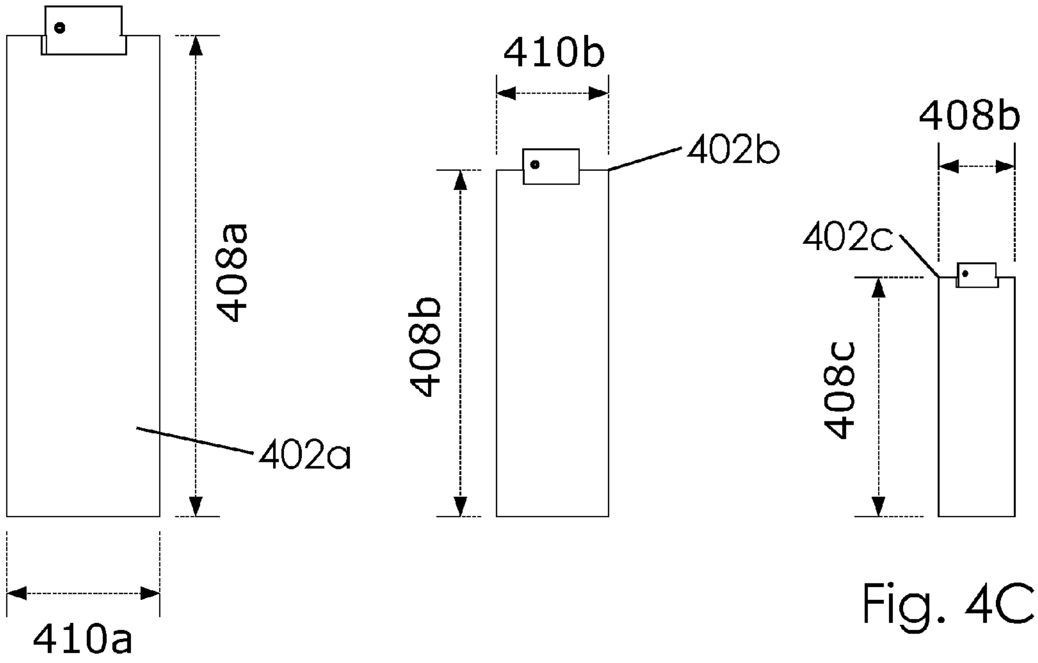
FIGS. 4C and 4D illustrate an elevated overview of said one or more removable tip portions of said sprinkler head remover.
Figure 4D:
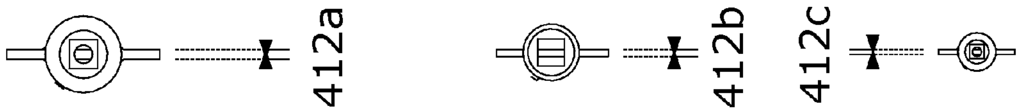

FIGS. 4C and 4D illustrate an elevated overview of said one or more removable tip portions of said sprinkler head remover 400. In one embodiment, said one or more removable tip portions can comprise a range of heights, widths and thicknesses in order to fit in a range of differently manufactured embodiments of said sprinkler socket 200. For example, in one embodiment, said first tip portion 402*a* can comprise a height 408*a*, a width 410*a* and a thickness 412*a*; said second tip portion 402*b* can comprise a height 408*b*, a width 410*b* and a thickness 412*b*; and said first tip portion 402*c* can comprise a height 408*c*, a width 410*c* and a thickness 412*c*.

Figure 5A:
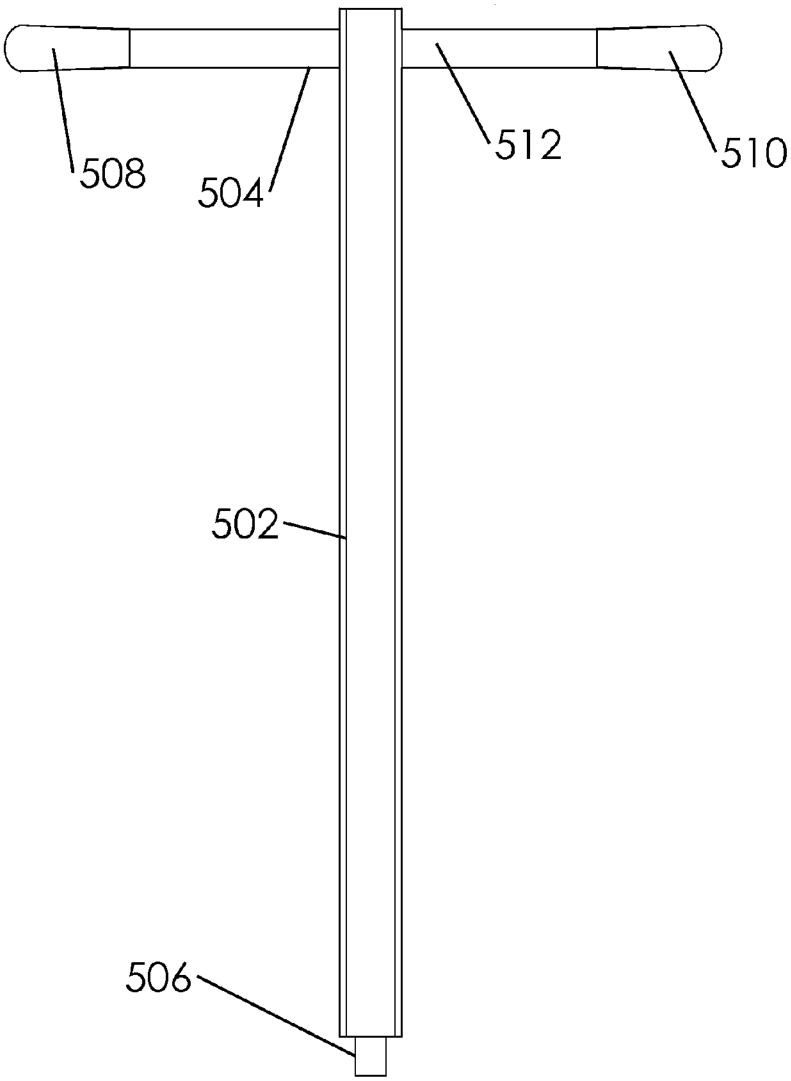
FIGS. 5A and 5B illustrate an elevated front view and side view of a shaft and a handle of said sprinkler head remover.
Figure 5B:
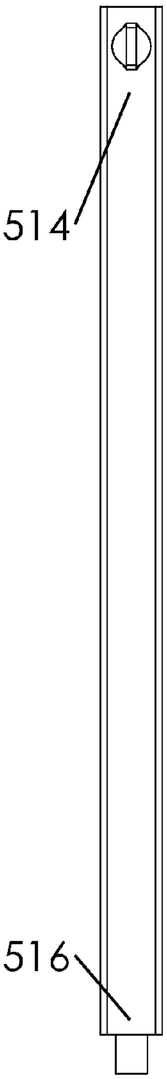

FIGS. 5A and 5B illustrate an elevated front view and side view of a shaft 502 and a handle 504 of said sprinkler head remover 400. Said sprinkler head remover 400 can comprise said shaft 502, said handle 504 and a socket base 506. In one embodiment, said socket base 506 can attach to said socket 406 of said one or more removable tip portions. Said handle 504 can comprise a first end 508, a second end 510 and a central portion 512. In one embodiment, said shaft 502 can comprise square tubing. In one embodiment, said shaft 502 can comprise an aperture capable of allowing a portion of said handle 504 to pass through said shaft 502. In one embodiment, said central portion 512 can slide freely through said shaft 502. Said shaft 502 can comprise a first end 514 and a second end 516. In one embodiment, said handle 504 can attach to said first end 514 of said shaft 502; and said socket base 506 can attach to said second end 516 of said shaft 502.

Figure 5C:
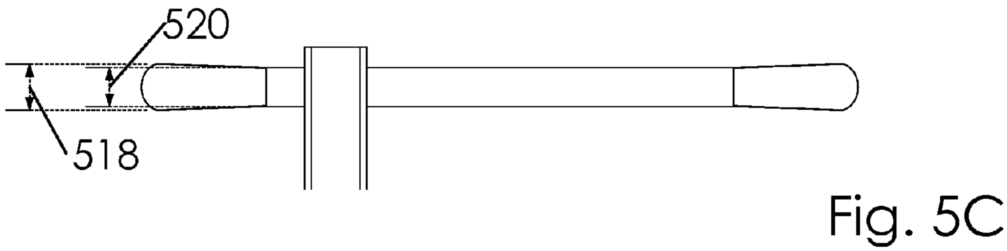
FIG. 5C illustrates an elevated front view of said handle attached to said shaft and in one or more non-centered positions.

FIG. 5C illustrates an elevated front view of said handle 504 attached to said shaft 502 and in one or more non-centered positions. In one embodiment, said handle 504 can slide between a centered position (as illustrated in FIG. 5A) and one of said one or more non-centered positions. In one embodiment, said first end 508 and said second end 510 can comprise a first external diameter 518. In one embodiment, said handle 504 can comprise a second external diameter 520. In one embodiment, said handle 504 can slide between said first end 508 and said second end 510 on said aperture in said shaft 502. In one embodiment, said handle 504 can slide freely in said aperture in said shaft 502 but said first end 508 and said second end 510 can comprise said first external diameter 518 being too large to slide freely in said aperture in said shaft 502. In one embodiment, said second external diameter 520 can comprise 5/16" (inches).

Figure 5D:
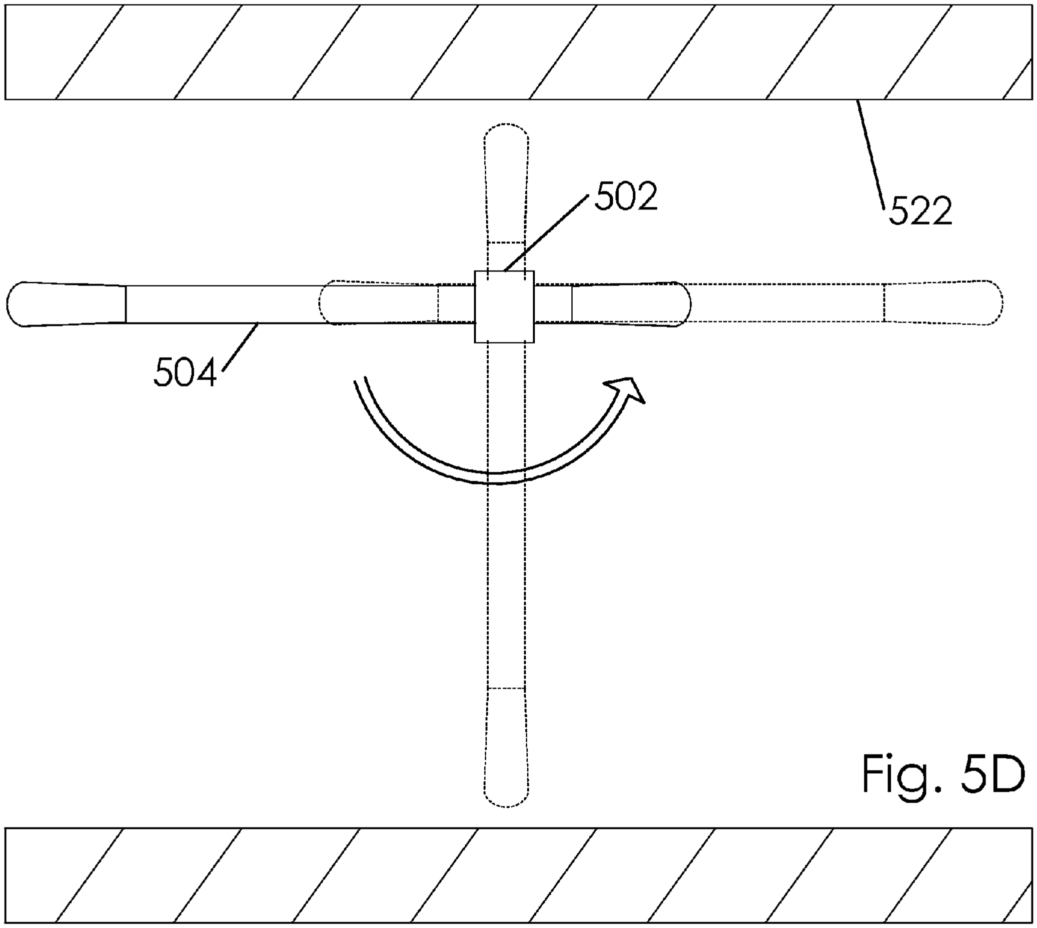
FIGS. 5D and 5E illustrate a perspective top view of said sprinkler head remover in use.
Figure 5E:
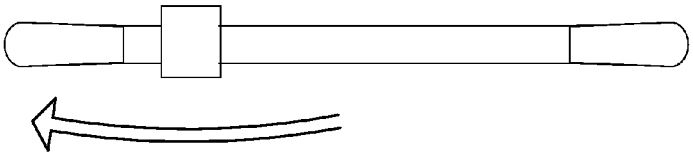

FIGS. 5D and 5E illustrate a perspective top view of said sprinkler head remover 400 in use. In one embodiment, said sprinkler head remover 400 can be used in a tight space since said handle 504 can slide freely on said shaft 502. For example, in one embodiment, said sprinkler head remover 400 can operate in a space limited by an obstacle 522. In one embodiment, turning said sprinkler head remover 100 in order to loosen said sprinkler socket 200 from said fluid source pipe 302 can further comprise: sliding said handle 504 to a first position relative to said shaft 502, rotating said handle 504 so as to rotate said shaft 502 (wherein, said handle 504 will no longer be in said first position), and sliding said handle 504 back to said first position. In one embodiment, this procedure can be conducted so as to avoid and/or minimize contact with said obstacle 522.

Figure 6A:
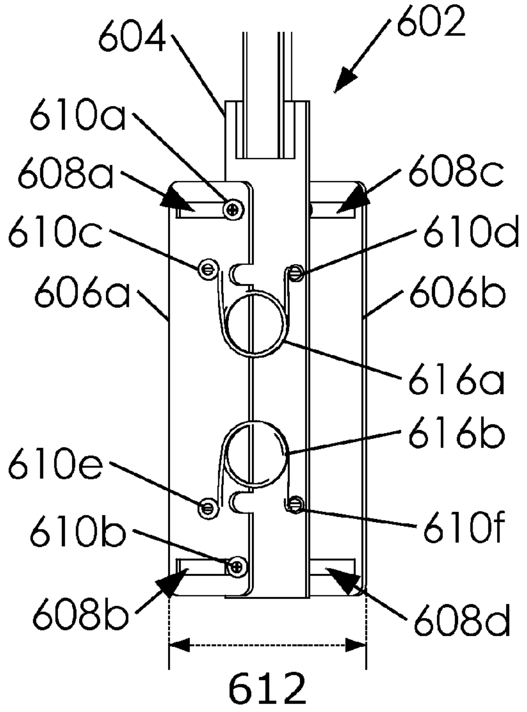
FIGS. 6A, 6B and 6C illustrate two elevated front views and an exploded perspective front view of said adjustable tip portion.
Figure 6B:
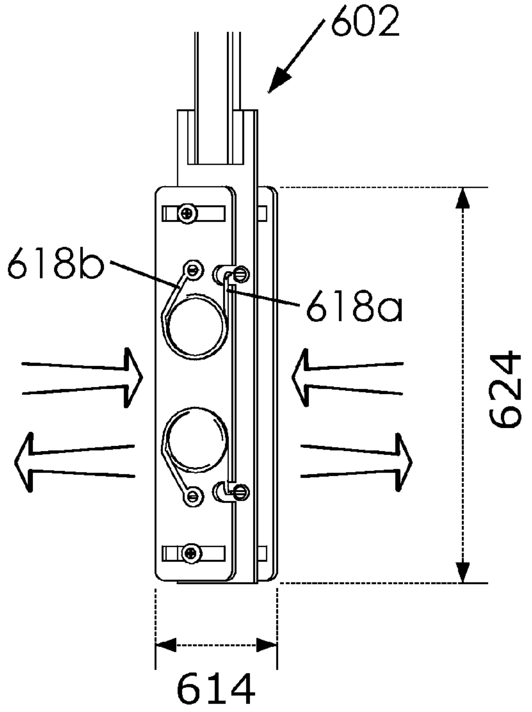
Figure 6C:
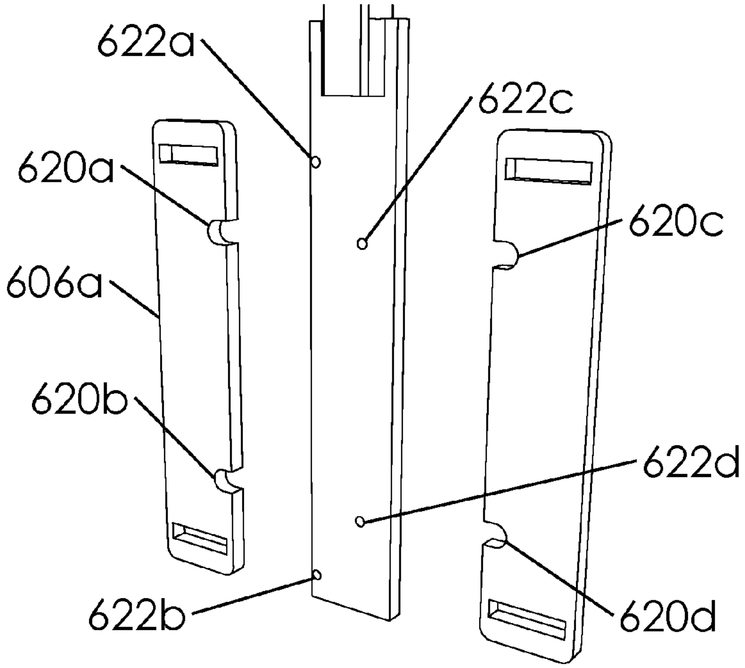

FIGS. 6A, 6B and 6C illustrate two elevated front views and an exploded perspective front view of said adjustable tip portion 602. FIG. 6A illustrates an expanded configuration of said adjustable tip portion 602. FIG. 6B illustrates a contracted configuration of said adjustable tip portion 602. In one embodiment, said adjustable tip portion 602 can comprise a base portion 604, one or more key plates, one or more springs, and one or more screws. In one embodiment, said one or more key plates can comprise a first plate 606*a* and a second plate 606*b*. In one embodiment, each of said one or more key plates can comprise one or more guide slots. In one embodiment, said one or more guide slots can comprise a first slot 608*a*, a second slot 608*b*, a third slot 608*c*, and a fourth slot 608*d*. In one embodiment, said first plate 606*a* can comprise said first slot 608*a* and said second slot 608*b*; and, said second plate 606*b* can comprise said third slot 608*c* and said fourth slot 608*d*. In one embodiment, said one or more screws can comprise a first screw 610*a*, a second screw 610*b*, a third screw 610*c*, a fourth screw 610*d*, a fifth screw 610*e* and a sixth screw 610*f*. In one embodiment, said one or more key plates can attach to said base portion 604 by: inserting one or more of said one or more screws through said one or more guide slots, and attaching said one or more of said one or more screws to said base portion 604. For example, in one embodiment, attaching said first plate 606*a* to said base portion 604 can comprise inserting said first screw 610*a* through said first slot 608*a* and said second screw 610*b* through said second slot 608*b*, and attaching said first screw 610*a* and said second screw 610*b* to said base portion 604.

In one embodiment, said one or more key plates can slidably attach to said base portion 604 as said one or more screws slide through said one or more guide slots. In one embodiment, the term "slidably" can mean that one item can slide relatively to one another item; thus, if a first object "slidably attaches" to another object, it is understood that said first object is attached to the second object but can nonetheless slide relative to the other object. In one embodiment, said adjustable tip portion 602 can slide to said expanded configuration (as illustrated in FIG. 6A) and said contracted configuration (as illustrated in FIG. 6B). In one embodiment, adjustable tip portion 602 can comprise an expanded width 612 and a contracted width 614. In one embodiment, said one or more springs can comprise a first spring 616*a* and a second spring 616*b*. In one embodiment, each of said one or more springs can comprise a first end 618*a* and a second end 618*b*. In one embodiment, said one or more springs can connect to said base portion 604 with said first end 618*a* and said one or more key plates with said second end 618*b*. For example, in one embodiment, said first end 618*a* can attach to said base portion 604 with said fourth screw 610*d*, and said second end 618*b* can attach to said base portion 604 with said third screw 610*c*. In one embodiment, said one or more springs can resist pressure to transition said adjustable tip portion 602 from said expanded configuration to said contracted configuration. That is, said one or more springs can naturally press (i.e., add tension to) said one or more key plates out from said base portion 604 into said expanded width 612. In one embodiment, transitioning said adjustable tip portion 602 from said expanded configuration to said contracted configuration can comprise: pressing said one or more key plates inward toward said base portion 604, contracting said one or more springs, sliding one or more of said one or more screws within said one or more guide slots, and/or sliding said first end 618*a* of said one or more springs into said first notch 620*a*.

In one embodiment, said one or more key plates can comprise one or more notches. In one embodiment, said one or more notches can comprise a first notch 620*a*, a second notch 620*b*, a third notch 620*c* and a fourth notch 620*d*. For example, in one embodiment, said first plate 606*a* can comprise said first notch 620*a* and said second notch 620*b*. In one embodiment, said one or more notches can receive a portion of said one or more springs when said adjustable tip portion 602 is in said contracted configuration. For example, in one embodiment, said first end 618*a* of said first spring 616*a* and a portion of said fourth screw 610*d* can slide into said first notch 620*a* with said adjustable tip portion 602 in said contracted configuration. In one embodiment, said base portion 604 can comprise one or more sockets capable of receiving one or more of said one or more screws. In one embodiment, said one or more sockets can comprise a first socket 622*a* capable of receiving a portion of said first screw 610*a*, a second socket 622*b* capable of receiving a portion of said second screw 610*b*, a third socket 622*c* capable of receiving a portion of said third screw 610*c*, and a fourth socket 622*d* capable of receiving a portion of said fourth screw 610*d*.

In one embodiment, said one or more key plates can comprise a height 624. In one embodiment, said height 624 can be substantially equal to said height 208 of said open top end 202.

In one embodiment, said base portion 604 and said one or more key plates are substantially planar, so that they fit flush with one another.

Figure 7A:
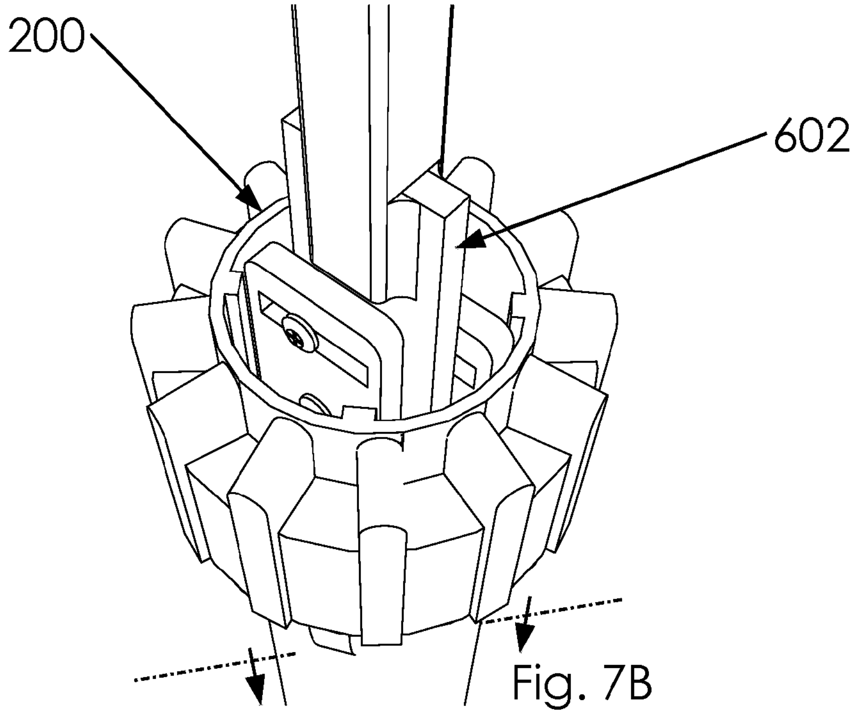
FIGS. 7A and 7B illustrate a perspective overview and an elevated cross-section top view of said adjustable tip portion inserted into said sprinkler socket.
Figure 7B:
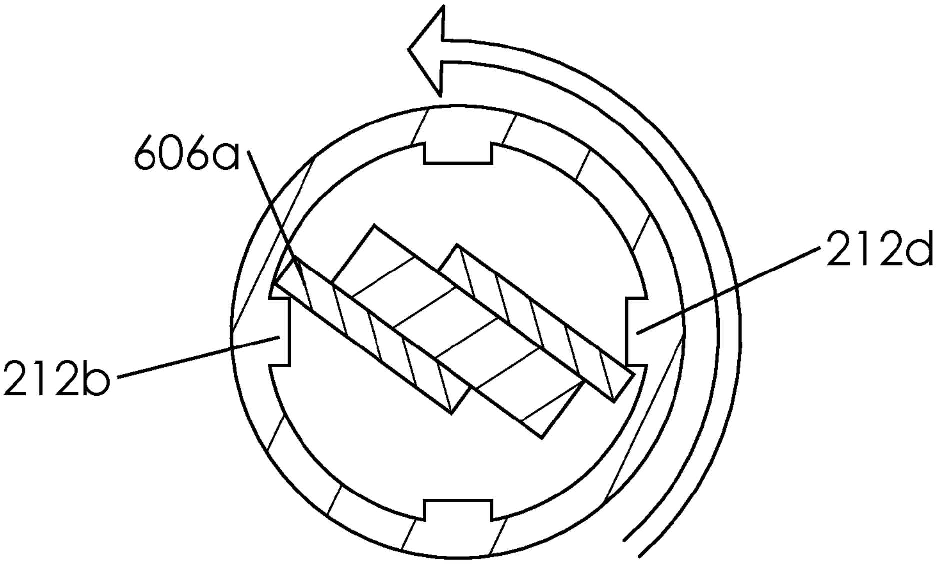
Figure 8A:
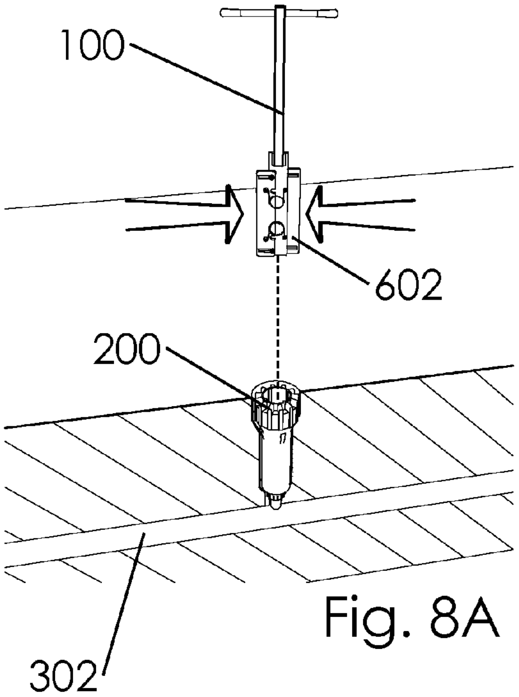
FIGS. 8A, 8B, 8C, and 8D illustrate four perspective overviews of said sprinkler head remover with said adjustable tip portion in use.
Figure 8B:
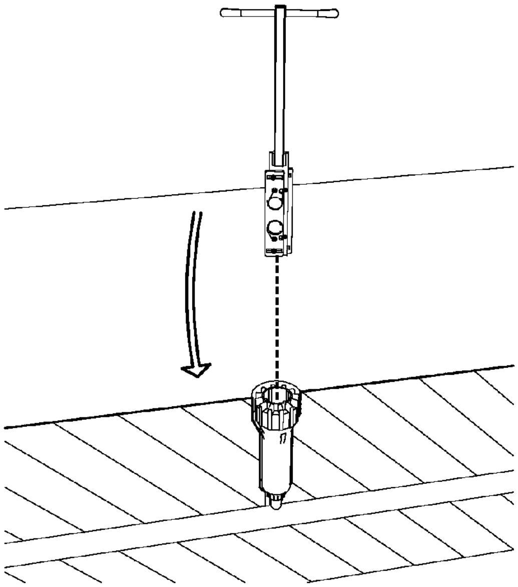
Figure 8C:
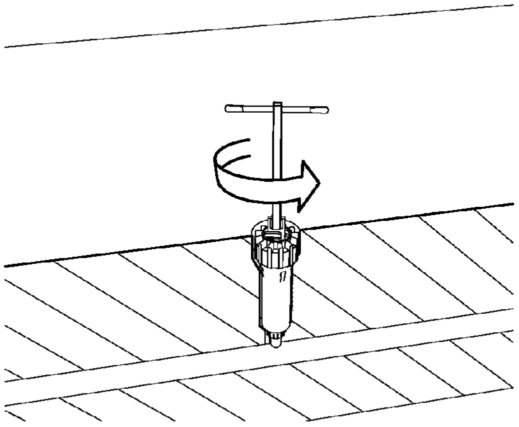
Figure 8D:
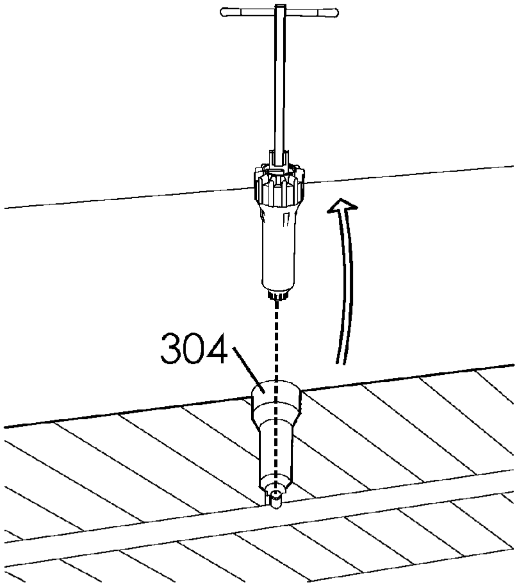

FIGS. 7A and 7B illustrate a perspective overview and an elevated cross-section top view of said adjustable tip portion 602 inserted into said sprinkler socket 200. FIG. 7A illustrates said adjustable tip portion 602 with a cross-section view of said ground 300.

In one embodiment, inserting said adjustable tip portion 602 into said sprinkler socket 200 can comprise: compressing said adjustable tip portion 602 from said expanded configuration toward said contracted configuration, inserting a portion of said adjustable tip portion 602 into said sprinkler socket 200, and expanding said adjustable tip portion 602 within said sprinkler socket 200. In one embodiment, said one or more key plates can catch one or more of said one or more ridges within said internal chamber 206 of said sprinkler socket 200.

FIG. 7B illustrates an elevated cross-section view of said sprinkler socket 200 with a cross-section of said adjustable tip portion 602 inserted therein. In one embodiment, catching one or more of said one or more ridges with one or more portions of said adjustable tip portion 602 can comprise: compressing said adjustable tip portion 602; inserting the compressed said adjustable tip portion 602 into said internal chamber 206; pressing said first plate 606*a* against a first of said one or more ridges (such as said second ridge 212*b*); pressing said second plate 606*b* against a second of said one or more ridges (such as said fourth ridge 212*d*). In one embodiment, said expanded width 612 of said adjustable tip portion 602 can be equal to or less than said internal diameter 210.

FIGS. 8A, 8B, 8C, and 8D illustrate four perspective overviews of said sprinkler head remover 100 with said adjustable tip portion 602 in use. In one embodiment, removing said sprinkler socket 200 from said fluid source pipe 302 can comprise: compressing adjustable tip portion 602; inserting said adjustable tip portion 602 of said sprinkler head remover 100 into said internal chamber 206 of said sprinkler socket 200; catching one or more of said one or more ridges with one or more portions of said tip portion 102; loosening said sprinkler socket 200 from said fluid source pipe 302; dislodging said sprinkler socket 200 from said fluid source pipe 302; and pulling said sprinkler socket 200 from said hole 304. In one embodiment, loosening said sprinkler socket 200 from said fluid source pipe 302 can comprise turning said sprinkler head remover 100 within said open top end 202 so as to dislodge said sprinkler socket 200 from said fluid source pipe 302.

Figure 9A:
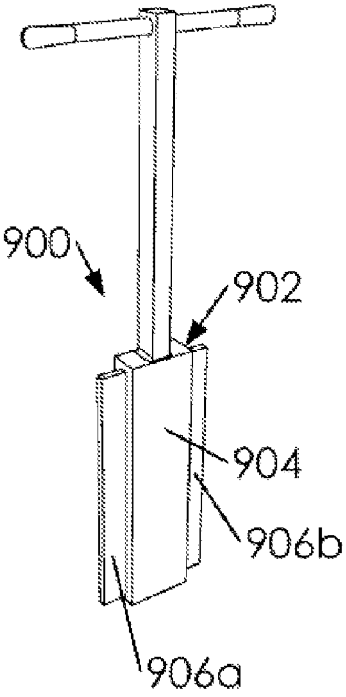
FIG. 9A illustrates a perspective side view of said sprinkler head remover with an adjustable tip portion.

FIG. 9A illustrates a perspective side view of said sprinkler head remover 900 with an adjustable tip portion 902. In one embodiment, said adjustable tip portion 902 can comprise a base portion 904 and one or more key plates. Said one or more key plates can comprise a first plate 903*a* and a second plate 903*b*.

Figure 9B:
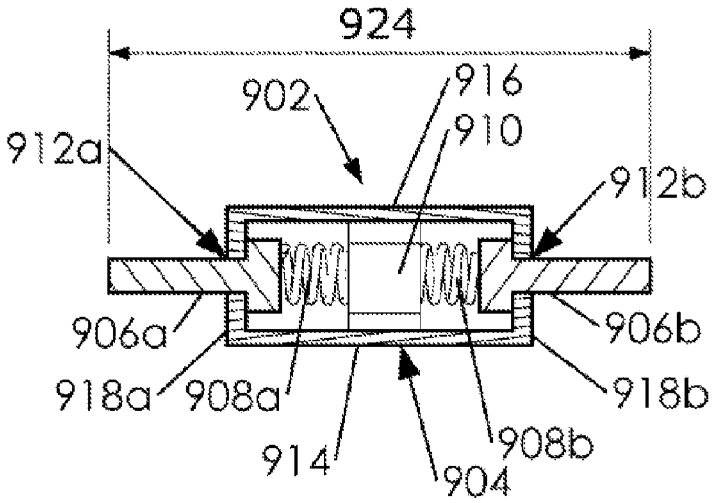
FIGS. 9B, 9C and 9D illustrate an elevated cross-section overview and perspective cross-section overview of said adjustable tip portion.
Figure 9C:
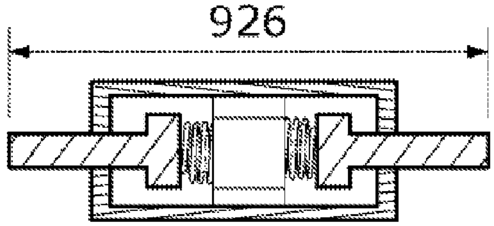
Figure 9D:
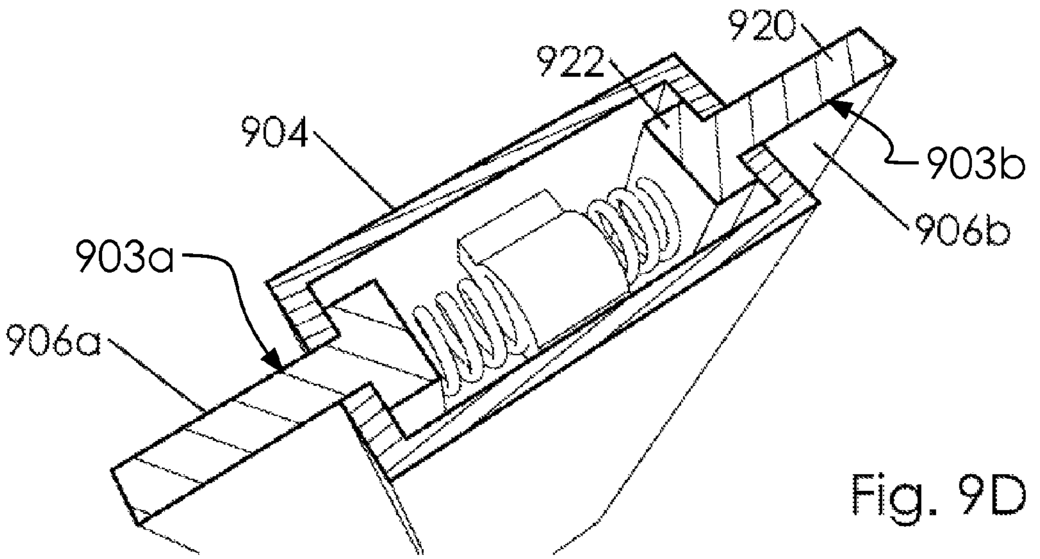

FIGS. 9B, 9C and 9D illustrate an elevated cross-section overview and perspective cross-section overview of said adjustable tip portion 902. FIG. 9B illustrates an expanded configuration of said adjustable tip portion 902. FIG. 9C illustrates a contracted configuration of said adjustable tip portion 902. In one embodiment, said adjustable tip portion 902 can comprise one or more springs. In one embodiment, said one or more springs can press said one or more key plates outward from said base portion 904. In one embodiment, said one or more springs can attach to a spring base 910 at one end and press against a portion of said one or more key plates at another end. In one embodiment, said one or more springs can comprise a spring 908*a* and a spring 908*b*. In one embodiment, said base portion 904 can comprise a substantially hollow member comprising one or more apertures; wherein, said one or more apertures are capable allowing a portion of said one or more key plates to slidably expand and contract from within said base portion 904. In one embodiment, said base portion 904 can comprise a substantially rectangular box. In one embodiment, said one or more apertures can comprise a first aperture 912*a* and a second aperture 912*b*. Base portion 904 can comprise a front 914, a back 916, a first side 918*a* and a second side 918*b*. In one embodiment, said first aperture 912*a* can be in said first side 918*a*, and said second aperture 912*b* can be in said second side 918*b*. In one embodiment, said spring base 910 can attach between said front 914 and said back 916 of said base portion 904. In one embodiment, said spring base 910 and said one or more springs can comprise a spring assembly. In one embodiment, said adjustable tip portion 902 can comprise a plurality of said spring assemblies.

In one embodiment, each of said one or more key plates can comprise a "T" shape having a lower portion 920 and an upper portion 922. In one embodiment, said lower portion 920 can move freely through said one or more apertures in said base portion 904. In one embodiment, said upper portion 922 can be wider than said one or more apertures; wherein, said one or more key plates are held within said base portion 904 by said upper portion 922.

In one embodiment, said adjustable tip portion 902 can comprise a range of widths between an expanded width 924 and a contracted width 926. In one embodiment, by squeezing said one or more key plates inward toward said base portion 904, said contracted width 926 can be achieved. In one embodiment, by releasing said one or more key plates, said expanded width 924 can be achieved.

Said adjustable tip portion 602 and said adjustable tip portion 902 can comprise a similar trait; viz., the ability to expand and contract to said expanded configuration and said contracted configuration. In one embodiment, these configurations can be used to remove said sprinkler socket 200 from said ground 300, as discussed supra. For example, in one embodiment, said sprinkler head remover 900 can remove said sprinkler socket 200 from said ground 300 by: squeezing said one or more key plates inward; inserting said adjustable tip portion 902 into said open top end 202; releasing said one or more key plates; catching said one or more notches with said one or more key plates of said adjustable tip portion 902; loosening said sprinkler socket 200 from said fluid source pipe 302; dislodging said sprinkler socket 200 from said fluid source pipe 302; and removing said sprinkler socket 200 from said ground 300.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A sprinkler head remover comprising:
a tip portion;
a handle having a first end and a second end;
said tip portion connects to said handle;
said tip portion of said sprinkler head remover releasably connects to a sprinkler socket of a sprinkler head;
said tip portion comprises an adjustable tip portion
said adjustable tip portion being adjustable by
expanding to an expanded configuration having an expanded width and
compressing to a contracted configuration having a contracted width;
said sprinkler socket releasably connects to said tip portion by
compressing said tip portion from an expanded configuration to a contracted configuration,
inserting a portion of said tip portion into said sprinkler socket,
expanding said tip portion within said sprinkler socket, and,
catching one or more ridges within an internal chamber of said sprinkler socket; and
said sprinkler head remover selectively removes a sprinkler socket from a fluid source pipe by
rotating said sprinkler socket from said fluid source pipe,
dislodging said sprinkler socket from said fluid source pipe, and
removing said sprinkler socket.

2. The sprinkler head remover of claim 1 further comprising a shaft having a first end and a
said second external diameter is greater than said second external diameter; wherein,
second end; wherein,
said tip portion attaches to said first end of said shaft; and,
said handle attaches to said second end of said shaft.

3. The sprinkler head remover of claim 2 wherein:
said handle comprises a first end, a second end and a central portion;
said shaft comprises an aperture;
said handle attaches to said shaft by sliding through said aperture in said shaft; and,
said handle selectively slides between a centered position and a one or more non-centered positions relative to said shaft.

4. The sprinkler head remover of claim 3 wherein:
said first end and said second end of said handle comprise a first external diameter;
said aperture in said shaft and said central portion of said handle comprise a second external diameter; and,
said second external diameter is greater than said second external diameter; wherein,
said handle selectively slides within said aperture in said shaft but does not detach from said shaft.

5. The sprinkler head remover of claim 1 wherein:
said sprinkler socket of said sprinkler head comprises one or more ridges along an internal chamber of said sprinkler socket; and,
said tip portion comprises a planar portion; and,
releasably connecting said tip portion of said sprinkler head remover to said sprinkler socket comprises:
inserting a portion of said tip portion into said internal chamber of said sprinkler socket and
catching said one or more ridges of said internal chamber with said portion of said tip portion within said sprinkler socket.

6. The sprinkler head remover of claim 1 wherein,
said adjustable tip portion comprises a base portion, a one or more key plates, and a one or more springs;
said base portion attaches to said handle;
said one or more key plates slidably attach to said base portion;
said one or more springs each comprise a first end and a second end;
said first ends of said one or more springs attach to said base portion;
said second ends of said one or more springs attach to said one or more key plates;
said one or more key plates selectively slide out to expand said adjustable tip portion to said expanded width;
said one or more springs naturally press said one or more key plates out toward said expanded configuration; and;
said one or more key plates slide in to contract said adjustable tip portion to said contracted configuration.

7. The sprinkler head remover of claim 6 wherein:
said base portion and said one or more key plates are each planar;
said base portion comprises a first side and a second side;
said one or more key plates comprise a first plate and a second plate;
said first plate slidably attaches to said first side of said base portion; and,
said second plate slidably attaches to said second side of said base portion.

8. The sprinkler head remover of claim 1 wherein,
said adjustable tip portion comprises a base portion, a one or more key plates, and a one or more springs;
said base portion attaches to said handle;
said base portion comprises a hollow member having a one or more spring bases and a one or more apertures;
said one or more springs each comprise a first end and a second end;
said first ends of said one or more springs each attach to one of said one or more spring bases;
said second ends of said one or more springs each attach to one of said one or more key plates;
a portion of said one or more key plates extrudes out of said one or more apertures of said base portion;
said second ends of said one or more springs attach to said one or more key plates;
said one or more key plates selectively slide out to expand said adjustable tip portion to said expanded width;

said one or more springs naturally press said one or more key plates out toward said expanded configuration; and;

said one or more key plates selectively slide in to contract said adjustable tip portion to said contracted configuration.

9. The sprinkler head remover of claim 8 wherein:

said one or more key plates comprise a first plate and a second plate;

said one or more key plates each comprise a "T" shape having a lower portion and a upper portion;

said upper portion of said one or more key plates attaches to said one or more springs;

a portion of said lower portion slides through said one or more apertures in said base portion; and, said upper portion is wider than said one or more apertures and therefore prevents one or more key plates from sliding completely out of said base portion.

10. A method of using a sprinkler head remover comprising:

releasably connecting to a sprinkler socket of a sprinkler head with a tip portion of a sprinkler head remover by compressing said tip portion from an expanded configuration to a contracted configuration, inserting a portion of said tip portion into said sprinkler socket, expanding said tip portion within said sprinkler socket, and, catching one or more ridges within an internal chamber of said sprinkler socket, said tip portion comprises an adjustable tip portion selectively expanding to said expanded configuration having an expanded width and contracting to said contracted configuration having a contracted width;

rotating said sprinkler socket from a fluid source pipe;

dislodging said sprinkler socket from said fluid source pipe; and removing said sprinkler socket; wherein, said sprinkler head remover comprises a handle, and, said tip portion connects to said handle.

* * * * *